US010679418B2

(12) United States Patent
Rakshit et al.

(10) Patent No.: US 10,679,418 B2
(45) Date of Patent: Jun. 9, 2020

(54) AUGMENTATION OF ITEM DIMENSIONS BASED ON DERIVED STORAGE LOCATIONS FOR ONLINE AND PHYSICAL SHOPPING

(71) Applicant: International Business Machines Corporation, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/130,147

(22) Filed: Sep. 13, 2018

(65) Prior Publication Data

US 2020/0090404 A1    Mar. 19, 2020

(51) Int. Cl.
  *G06T 19/00*    (2011.01)
  *G06Q 10/08*    (2012.01)
  *G06Q 30/06*    (2012.01)
  *G06T 7/60*    (2017.01)
  *G06T 17/00*    (2006.01)
  *G06T 19/20*    (2011.01)

(52) U.S. Cl.
  CPC ......... *G06T 19/006* (2013.01); *G06Q 10/087* (2013.01); *G06Q 30/0633* (2013.01); *G06Q 30/0643* (2013.01); *G06T 7/60* (2013.01); *G06T 17/00* (2013.01); *G06T 19/20* (2013.01)

(58) Field of Classification Search
  None
  See application file for complete search history.

(56) References Cited

U.S. PATENT DOCUMENTS

| | | | |
|---|---|---|---|
| 6,246,998 B1 * | 6/2001 | Matsumori | G06Q 30/06 705/26.8 |
| 6,587,835 B1 | 7/2003 | Treyz et al. | |
| 8,810,392 B1 * | 8/2014 | Teller | G08B 21/24 235/385 |
| 9,240,077 B1 * | 1/2016 | Kraft | G06T 19/006 |
| 9,301,603 B1 * | 4/2016 | Koehn | A47B 43/00 |

(Continued)

OTHER PUBLICATIONS

"ARKit", Apple Developer, Copyright © 2018 Apple Inc., <https://developer.apple.com/arkit/>, printed Aug. 1, 2018, 5 pages.

(Continued)

*Primary Examiner* — David H Chu
(74) *Attorney, Agent, or Firm* — Joseph P. Curcuru

(57) ABSTRACT

Embodiments describe an approach for improving the augmentation and organizing of items based on a derived storage space. Embodiments improve augmentation and organizing of items by determining a preferred storage space for one or more items. Analyzing dimensional data of the one or more items and the preferred storage space. Calculating if the one or more items fits in the preferred storage space based on the analysis of the dimensional data, and displaying an augmented reality model of the one or more items in the storage space and an augmented reality call out, indicating whether the one or more items fits in the preferred storage space based on the calculation.

17 Claims, 10 Drawing Sheets

(56) References Cited

U.S. PATENT DOCUMENTS

| | | | |
|---|---|---|---|
| 9,449,342 B2 | 9/2016 | Sacco | |
| 9,734,634 B1 | 8/2017 | Mott et al. | |
| 2003/0177072 A1* | 9/2003 | Bared | G06Q 30/06 |
| | | | 705/26.81 |
| 2007/0255632 A1* | 11/2007 | Hatano | G06Q 10/087 |
| | | | 705/28 |
| 2013/0106910 A1* | 5/2013 | Sacco | G06T 19/006 |
| | | | 345/633 |
| 2013/0293530 A1 | 11/2013 | Perez et al. | |
| 2014/0100997 A1 | 4/2014 | Mayerle et al. | |
| 2016/0071149 A1* | 3/2016 | Farshori | G06Q 30/0253 |
| | | | 705/14.51 |
| 2016/0180441 A1* | 6/2016 | Hasan | G06Q 30/0631 |
| | | | 705/26.7 |
| 2017/0337742 A1* | 11/2017 | Powderly | G02B 27/017 |
| 2018/0350145 A1* | 12/2018 | Byl | G06T 19/006 |

OTHER PUBLICATIONS

"Tango (platform), Wikipedia, The Free Encyclopdia", <https://en.wikipedia.org/wiki/Tango_(plafform)>, page last edited on Jul. 23, 2018, 5 pages.

* cited by examiner

AUGMENTATION OF ITEM DIMENSIONS BASED ON DERIVED STORAGE LOCATIONS FOR ONLINE AND PHYSICAL SHOPPING

BACKGROUND OF THE INVENTION

Augmented reality and/or virtual reality are making their way into everyday life. Some may see this as a burden or a distraction; however, augmented reality and/or virtual reality are coming together to help enhance everyday life for ordinary people. Currently, augmented reality and/or virtual reality are demonstrating very promising advances and enhancements to the everyday consumer. Augmented reality and/or virtual reality have the ability to make physical and online shopping more convenient and functional for consumers.

SUMMARY

Embodiments of the present invention disclose a method, a computer POINTER-BASED GUI FOR MOBILE DEVICES POINTER-BASED GUI FOR MOBILE DEVICES product, and a system for improving eligibility criteria matching for clinical trials. A method for augmenting and organizing items based on a derived storage space, the method comprising determining, by the one or more processors, a preferred storage space for one or more items. Analyzing, by the one or more processors, dimensional data of the one or more items and the preferred storage space. Calculating, by the one or more processors, if the one or more items fits in the preferred storage space based on the analysis of the dimensional data, and displaying, by the one or more processors, an augmented reality model of the one or more items in the storage space and an augmented reality call out, indicating whether the one or more items fits in the preferred storage space based on the calculation.

A computer system for augmenting and organizing items based on a derived storage space, the computer system comprising: one or more computer processors; one or more computer readable storage devices; program instructions stored on the one or more computer readable storage devices for execution by at least one of the one or more computer processors, the stored program instructions comprising: program instructions to determine a preferred storage space for one or more items. Program instructions to analyze dimensional data of the one or more items and the preferred storage space. Program instructions to calculate if the one or more items fits in the preferred storage space based on the analysis of the dimensional data; and program instructions to display an augmented reality model of the one or more items in the storage space and an augmented reality call out, indicating whether the one or more items fits in the preferred storage space based on the calculation.

A computer program product for augmenting and organizing items based on a derived storage space, the computer program product comprising: one or more computer readable storage devices and program instructions stored on the one or more computer readable storage devices, the stored program instructions comprising: program instructions to determine a preferred storage space for one or more items. Program instructions to analyze dimensional data of the one or more items and the preferred storage space. Program instructions to calculated if the one or more items fits in the preferred storage space based on the analysis of the dimensional data; and program instructions to display an augmented reality model of the one or more items in the storage space and an augmented reality call out, indicating whether the one or more items fits in the preferred storage space based on the calculation.

DETAILED DESCRIPTION

Embodiments of the present invention derive/determine where a given item is typically stored by a user and derive/determine if that item will fit within the dimensions of the derived storage space. Embodiments of the present invention can be applied to physical shopping (e.g., shopping at a brick and mortar store), online shopping, and/or any other procurement scenario.

Figure 2:
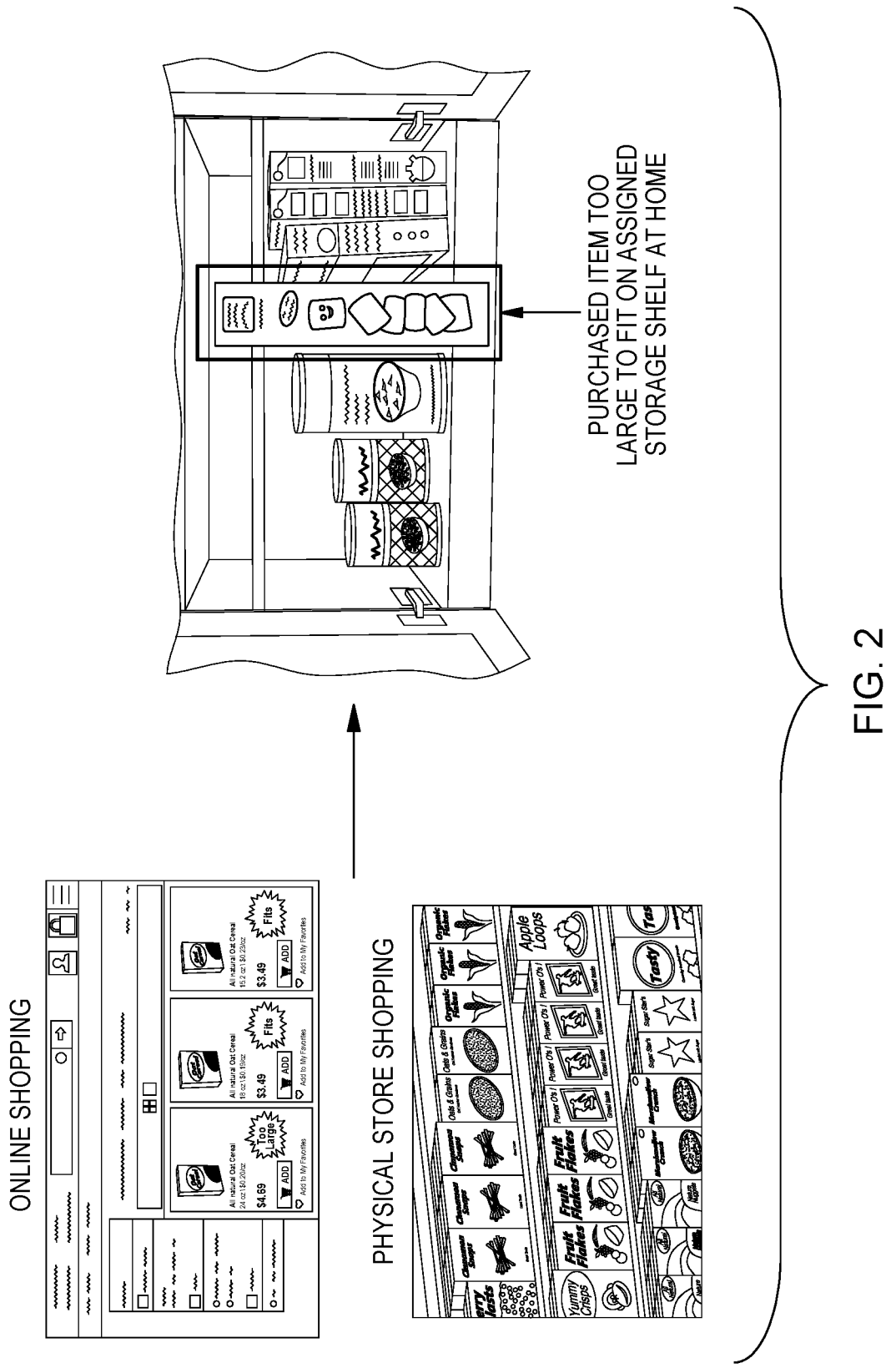
FIG. 2 illustrates an embodiment of virtual dimensional assessment component 122, on a computing device within the distributed data processing environment of FIG. 1, in accordance with an embodiment of the present invention.

Shopping items often come in multiple sizes. For example, consider that a box of breakfast cereal may be offered in three sizes: 15 oz, 18 oz, and Family Size. A user may select one of these sizes, bring the item home, and then find there is not enough space to store the item in its assigned space (on the shelf that holds all the other boxes of breakfast cereal). This occurs because the user has difficulty visualizing how an item will fit in storage, as shown in FIG. 2.

Embodiments of the present invention address the problem of a user not knowing if there is enough space to store an item and/or if the selected item fits within the predetermined dimensions of the storage space for both online and physical store shopping. Embodiments of the present invention can derive where a user stores one or more categories of items, and the available space in this storage area. Embodiments of present invention can augment one or more items listed online to show if they will fit in one or more predetermined storage areas by determining if the one or more selected items are too large and/or too small for the one or more derived storage areas. Additionally, embodiments of the present invention can augment items viewed using a mobile device's camera to show if items in a physical store will fit or are too large for the derived storage area. While the embodiments and/or examples above describe an online shopping example, embodiments of the present invention can be applied to any procurement scenario where purchases are made and then later stored. For example, the invention can show if a given purchase will fit in a user's car.

It should be noted that storage area, storage space, and/or storage location are interchangeable and possess the same meaning. Additionally, preferred storage area and/or preferred storage location are interchange able and can have the same meaning.

Distributed data processing environment 100 includes computing device 110 and server computer 120 interconnected over network 130. Network 130 can be, for example, a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three, and can include wired, wireless, or fiber optic connections. Network 130 can include one or more wired and/or wireless networks that can receive and transmitting data, voice, and/or video signals, including multimedia signals that include voice, data, text and/or video information. In general, network 130 can be any combination of connections and protocols that will support communications between computing device 110 and server computer 120, and any other computing devices (not shown in FIG. 1) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, a radio, stereo system, a cloud based service (e.g., a cognitive cloud based service), and/or any programmable electronic computing device capable of communicating with various components and devices within distributed data processing environment 100, via network 130 or any combination therein. In general, computing device 110 are representative of any programmable mobile device or a combination of programmable mobile devices capable of executing machine-readable program instructions and communicating with users of other mobile devices via network 130 and/or capable of executing machine-readable program instructions and communicating with server computer 120. In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 includes an instance of user interface 106. Computing device 110 and user interface 106 allow a user to interact with virtual dimensional assessment component (VDAC) 122 in various ways, such as sending program instructions, receiving messages, sending data, inputting data, editing data, correcting data, and/or receiving data. In various embodiments, not depicted in FIG. 1, computing device 110 can have one or more user interfaces. In other embodiments, not depicted in FIG. 1 environment 100 can comprise one or more computing devices (e.g., at least two).

User interface (UI) 106 provides an interface to VDAC 122 on server computer 120 for a user of computing device 110. In one embodiment, UI 106 can be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, UI 106 can also be mobile application software that provides an interface between a user of computing device 110 and server computer 120. Mobile application software, or an "app," is a computer program designed to run on smart phones, tablet computers and other mobile devices. In an embodiment, UI 106 enables the user of computing device 110 to send data, input data, edit data (annotations), correct data and/or receive data.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 10.

Each of shared storage 124 and local storage 108 can be a data/knowledge repository and/or a database that can be written to and/or read by one or a combination of VDAC 122, server computer 120 and/or computing device 110. In the depicted embodiment, shared storage 124 resides on server computer 120. In another embodiment, shared storage 124 can reside elsewhere within distributed data processing environment 100 computing device 110 has access to shared storage 124. A database is an organized collection of data. Shared storage 124 and/or local storage 108 can be implemented with any type of storage device capable of storing data and configuration files that can be accessed and utilized by server computer 120, such as a database server, a hard disk drive, or a flash memory. In other embodiments, shared storage 124 and/or local storage 108 can be hard drives, memory cards, computer output to laser disc (cold storage), and/or any form of data storage known in the art.

In some embodiments, shared storage 124 and/or local storage 108 can be cloud storage systems and/or databases linked to a cloud network. In various embodiments, VDAC 122 can search, identify, match, and/or retrieve historic information of issues/problems that have been fixed and/or identified previously from a knowledge repository (e.g., shared storage 124 and/or local storage 108). For example, VDAC 122 will search and/or store the features/symptoms related to the issue/problem to shared storage 124, which VDAC 122 can access later to either reuse to determine/configure one or more items/objects dimensions and/or weight. In this example, VDAC 122 can create a database based on collected information from items it has analyzed. In various embodiments, the knowledge repository enables VDAC 122 to be self-learning.

In various embodiments, Virtual Dimensional Assessment Component (VDAC) 122 can classify a user's items in storage through cognitive visual recognition to derive where given classifications of items are stored. In some embodiments VDAC 122 can augment an online shopping site to show which items will fit in a user's derived storage space for that item. In various embodiments, VDAC 122 can utilize augmented reality to augment a mobile device that is capturing an item on its camera to show if that item will fit in a user's derived storage space for that item by analyzing, determining, and comparing an items dimensions with the users derived storage space. In some embodiments, VDAC 122 can receive one or more images from a camera on computing device 110 to derive if a given item will fit in its derived storage space based upon the items currently residing in that space and/or other items that have already been purchased to occupy the same space. For example, VDAC 122 searches shared storage 124 and the Internet to find the dimensions for a particular brand of soda. In various embodiments, a user can enter the dimensions of the derived storage space and/or selected items. In other embodiments, VDAC 122 can determine the dimensions of the derived storage space and/or selected items automatically using algorithms and perspective vantage points. In various embodiments, VDAC 122 can derive where a selected item is typically stored, analyze if the item will fit in this derived storage space, and augment the item and its dimensions during an online session or during a physical shopping, via computing device 110.

Figure 3:
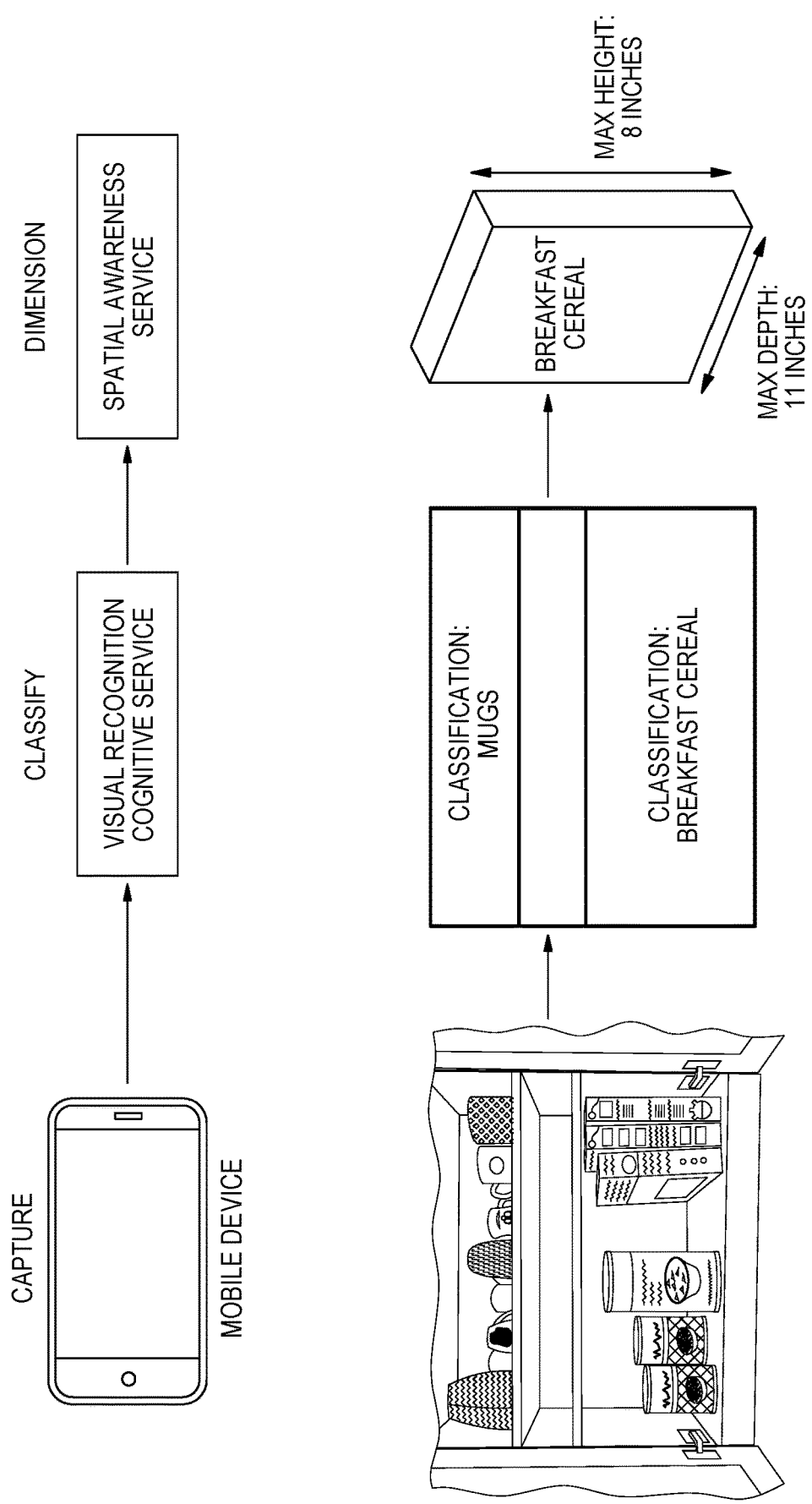
FIG. 3 illustrates an embodiment of virtual dimensional assessment component 122, on a computing device within the distributed data processing environment of FIG. 1, in accordance with an embodiment of the present invention.

In one embodiment, VDAC 122 can capture an image of one or more storage areas, via computing device 110, in which VDAC 122 can classify and size the one or more storage areas. For example, a user captures photographs on their mobile device of storage areas such as: a fridge, pantries, closets, the garage, and cupboards in their house. In this particular example, each photo is sent to a cognitive system for analysis. The cognitive system utilizes a Visual Recognition Cognitive Service to classify each object appearing in a photo. For example, the Visual Recognition Service may classify the following:

Classification: Storage area
    Sub-classification: Cupboard
    Sub-classification: Shelf
    Sub-classification: Shelf
    Classification: Breakfast cereal
    Sub-classification: Organic Oats
    Sub-classification: Organic Oats
    Sub-classification: Old Fashioned Oats
    Sub-classification: Steal Cut Oats
    Sub-classification: Wheat Cereal
    Sub-classification: Chocolate Cereal In this particular example, VDAC 122 analyzes the placement of these classifications to build a model of where the items are placed and/or should be placed. For example, the system derives that all classifications of "breakfast cereal" are placed on the bottom shelf of a given cupboard. In various embodiments, VDAC 122 can prompt and/or enable a user to establish storage preferences for certain classifications of items, in which a user can enter the preferred storage location for each item. In other embodiments, VDAC 122 can learn, determine, and/or configure a user's storage preferences by observing and/or analyzing captured images and/or videos of the storage spaces. In this particular example, VDAC 122 receives photographs of a box breakfast cereal and the preferred storage space from a smartphone. In this particular example, VDAC 122 can derive the dimensions of the box breakfast cereal and the dimensions and/or available space in the preferred storage area based on the received photographs. In this particular example, VDAC 122 can classify the breakfast cereal via visual recognition cognitive service and utilize a spatial awareness service to derive the size and depth of the breakfast cereal based on the analysis of the received photographs. In this particular example, VDAC 122 measures the height between the shelves and the depth of the cupboard to determine the dimensions of largest object that could fit into this space. As depicted in FIG. 3 VDAC 122 uses a spatial awareness service, via computing device 110, to derive the largest box of breakfast cereal that could fit on the shelf would be 11 inches in depth and 8 inches in height. In various embodiments, product and/or storage area measurements can be stored on a cloud-based repository (e.g., shared storage 124).

In various embodiments, VDAC 122 can generate a virtual augmentation of one or more items while online shopping. For example, a user is shopping in an online store. The user's online shopping profile can connect to a cloud-based repository storing the user's storage classifications and data pertaining to where the user stores the items (e.g., storage preferences) and the dimensions available to store the items. In this particular example, VDAC 122 augments items shown in the online store to indicate which of these items will fit in one or more storage areas based upon where a user typically stores these items (e.g., storage preferences) and the dimensions of the storage space, see FIG. 4.

Figure 4:
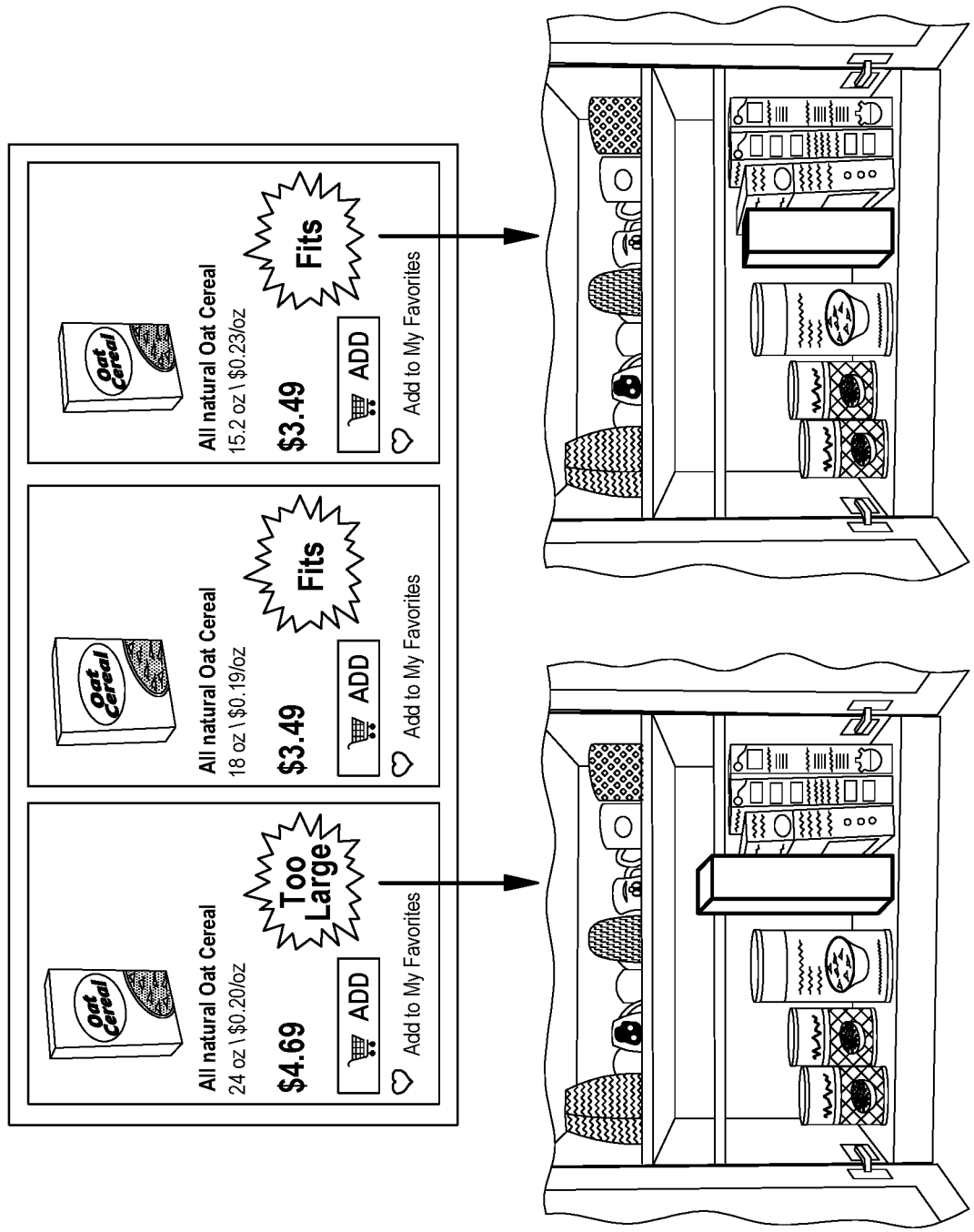
FIG. 4 illustrates an embodiment of virtual dimensional assessment component 122, on a computing device within the distributed data processing environment of FIG. 1, in accordance with an embodiment of the present invention.

FIG. 4 demonstrates the example of a user viewing various sizes of breakfast cereal on an online browser and VDAC 122 notifying the user if the breakfast cereal will fit in the storage area prior to the user purchasing the breakfast cereal and/or notify the user if the breakfast cereal will fit in the storage area after the user purchases the breakfast cereal, wherein a user is enabled to cancel the order if the breakfast cereal doesn't fit. In this particular example, VDAC 122 is displaying an image and/or a dimensional diagram and/or figure via augmented reality to determine and demonstrate to the user whether the breakfast cereal box/container fits in the pantry.

In this particular example, VDAC 122 looks up the category of the items the user is viewing (each item is classified as "breakfast cereal"), the specific items viewed ("Oats Cereal 18 oz") and retrieves the dimension of these items; analyzes the categorization ("breakfast cereal") to determine where a user typically stores this item, and retrieves the maximum dimensions for item storage in this area (11" depth, 8" height); compares each item's actual dimensions with the maximum dimensions of the user's storage area; renders a callout/notification alongside each item to instruct the shopper if the item will fit in this storage space (the two smaller sizes will fit but the family size box is too tall); and/or for a given item, renders how the item will fit in the derived storage space, as augmented on the photograph of the storage area and/or provide various orientations of the item and provide the most optimal orientation/position for the container (e.g., cereal box). In various embodiments, the callout/notification can read as "too large", "too small", "fits", "perfect fit", "tight fit", "possible fit", "will not fit", "no", "yes", and/or any other wording known in the art that indicate whether or not an item will fit. In some embodiments, VDAC 122 can provide a confidence level based on a predetermined value and/or range. VDAC 122 calculates a confidence level corresponding to an item and the item's corresponding space within a predetermine storage area (e.g., a shelf) based on the determined dimensions of the item and the storage area, wherein the confidence level indicates a level of certainty that the item will fit in the corresponding space within a predetermine storage area. In various embodiments, VDAC 122 can provide and/or display one or more optimal storage arrangements for one or more items in a storage space enabling the user to maximize their usage of the storage space.

Figure 5:
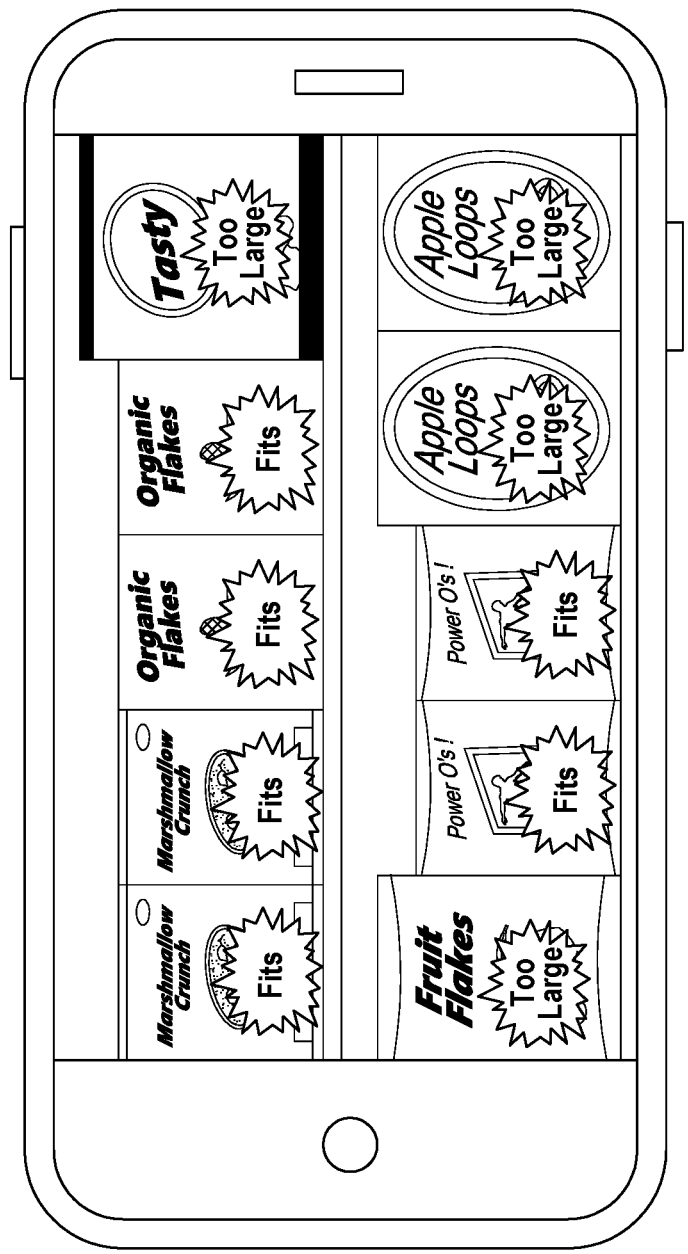
FIG. 5 illustrates an embodiment of virtual dimensional assessment component 122, on a computing device within the distributed data processing environment of FIG. 1, in accordance with an embodiment of the present invention.

In some embodiments, VDAC 122 can capture an image of one or more storage areas and generate a virtual augmentation of one or more items while a user is physically shopping (e.g., in a brick and mortar store). In various embodiments, a user can capture pictures and/or videos of one or more items on display in a physical store (e.g., brick and mortar store) using the camera on computing device 110. In various embodiments, VDAC 122 can augment a callout (e.g., a label and/or visual representation) on one or more items shown on the mobile device screen to indicate which of these items will fit based upon where a user typically stores these items and the dimensions available to store them. For example, as shown in FIG. 4 and FIG. 5, a user is viewing various sizes of breakfast cereal, and in this particular example, VDAC 122 utilizes the visual recognition cognitive service to derive the category of the items the user is capturing with the camera on computing device 110, wherein each item is classified as "breakfast cereal", and the specific item captured is "Cinnamon Cereal 18 oz". In this particular example, VDAC 122 can retrieve the dimensions of the one or more captured items (e.g., Cinnamon Cereal 18 oz) from a cloud database. In some embodiments, VDAC 122 can derive the category of the one or more items based on the location of the item in store.

In this particular example, as shown in FIG. 4 and FIG. 5, VDAC 122 compares the categorization ("breakfast cereal") to where a user typically stores this item and retrieves the maximum dimensions for item storage in one or more predetermined storage area (11" depth, 8" height). In this particular example, VDAC 122 compares each item's actual dimensions with the maximum dimensions of the predetermined storage area and renders a callout next to each item on the mobile device screen (e.g., UI 106) via augmented reality to instruct the shopper if the item will fit in this storage space. In various embodiments, the callout can be next to, alongside, grouped, behind, above, inside, in front of, on top of, and/or any other orientation associated with an item known in the art, as shown in FIG. 5. In various embodiments, for a given item, the user can tap an item to render how the item will fit in the derived storage space, as augmented on the image of the storage area.

In another example, a user is shopping in a physical store and wondering if the frozen turkey will fit in the freezer, VDAC 122 utilizes one or more Visual Recognition cognitive service to derive the category of the items the user is capturing with the camera of the mobile device (each item is classified as "frozen food"), the specific item captured ("Frozen Turkey 101*b*") and determines/establishes the dimensions of the frozen turkey by analyzing the one or more images of the Frozen Turkey and calculating its dimensions based known sizes of nearby objects, the focal length, object distance, and/or vantage point or the Frozen Turkey and the nearby objects. In this particular example, VDAC 122 compares the categorization ("frozen food") to determine where a user typically stores frozen food items and retrieves the maximum dimensions for item storage in this storage area (e.g., the freezer), which is 13" depth, 7" height. In other embodiments, VDAC 122 can determine the maximum dimensions for item storage in a storage area for one or more particular items and/or maximum dimensions of available space in a storage area. Continuing the example above, VDAC 122 compares each item's actual dimensions with the maximum dimension of the user's storage area and renders a callout alongside/next to one or more items on the mobile device screen via augmented reality, in which the callout instructs the shopper regarding whether the item will fit in this storage space. In this particular example, the user can interact with the item through UI 106, by taping and/or touching the item and/or the callout on the mobile device screen, to render how the item will fit in the derived storage space, as augmented on the picture/image of the storage area. In other embodiments, the user can interact with one or more of the items and/or callout in real life/physically, augmented reality, and/or virtual reality. For example, the user can physically touch the frozen turkey to retrieve details about the turkey and storage space dimensions.

In this embodiment, VDAC 122 can derive, in real-time, if an item will fit in a given storage space based upon the available room in that storage space with other items that are already present or have also been purchased. In various embodiments, a connected camera is placed in a storage space such as a fridge or shelf. In other embodiments, VDAC 122 can calculate/derive the available space based on a previously taken photo and/or video. For example, a user takes a photo of the pantry and/or fridge before going to the grocery store. In various embodiments, VDAC 122 can periodically use a Visual Recognition cognitive service and Spatial Awareness Service to categorize each item, its' placement, and its' dimensions as described previously, in which the characterization and/or dimension information is stored on a cloud-based repository.

Figure 6:
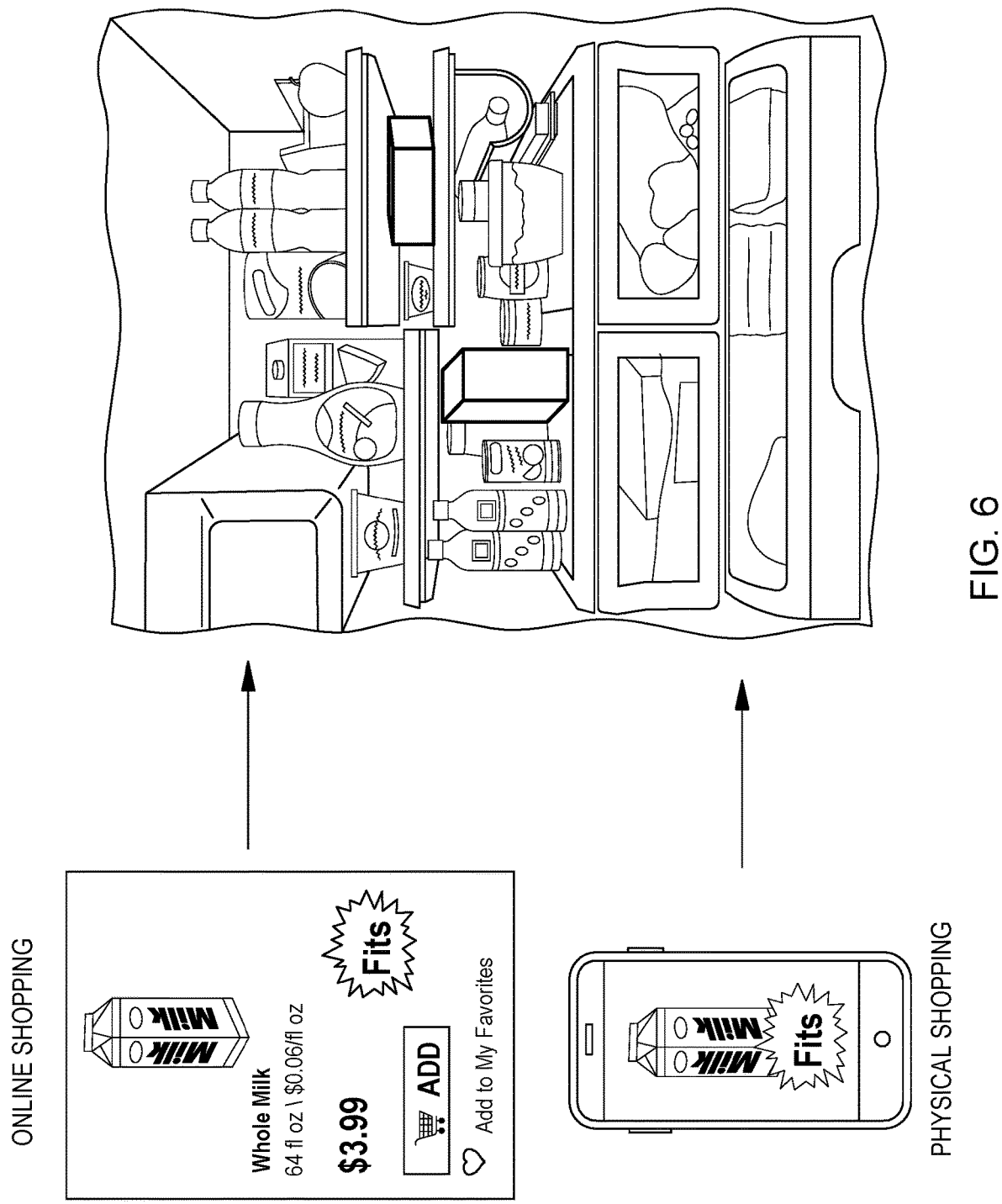
FIG. 6 illustrates an embodiment of virtual dimensional assessment component 122, on a computing device within the distributed data processing environment of FIG. 1, in accordance with an embodiment of the present invention.

In various embodiments, when a user is online shopping and viewing an item, and/or when a user is physically in store and captures an item with the camera of their mobile device, the system derives: the item, its category, and its storage location. The storage location can be derived based upon where a user has previously kept an item ("the ketchup is kept in the fridge") or the recommended storage space for an item ("a carton of milk must be refrigerated"). In this particular embodiment, as shown in FIG. 6, VDAC 122 compares the derived storage space (the fridge) with the dimensions of the item (size of the milk carton) and derives if there is sufficient space to store the item. In this particular embodiment, VDAC 122 augments either the online shopping site or the mobile device to show that a given item does or does not fit based on the current items already stored in that storage space. In various embodiments, VDAC 122 can also account for other items the user has purchased in a shopping session that have not yet been stored (for example space in the fridge needs to be saved for the orange juice bottle already purchased). In various embodiments, for a given item, the user can tap an item to render how the item will fit in the derived storage space, as augmented on the photograph of the storage area. If the item will fit in multiple locations, each location where the item can fit can be shown. This is illustrated in FIG. 6. In some embodiments, VDAC 122 can learn a user's storage preferences when a user enables VDAC 122 to access a microphone and listen to item storage locations. For example, "I keep the ketchup in the fridge."

Figure 7:
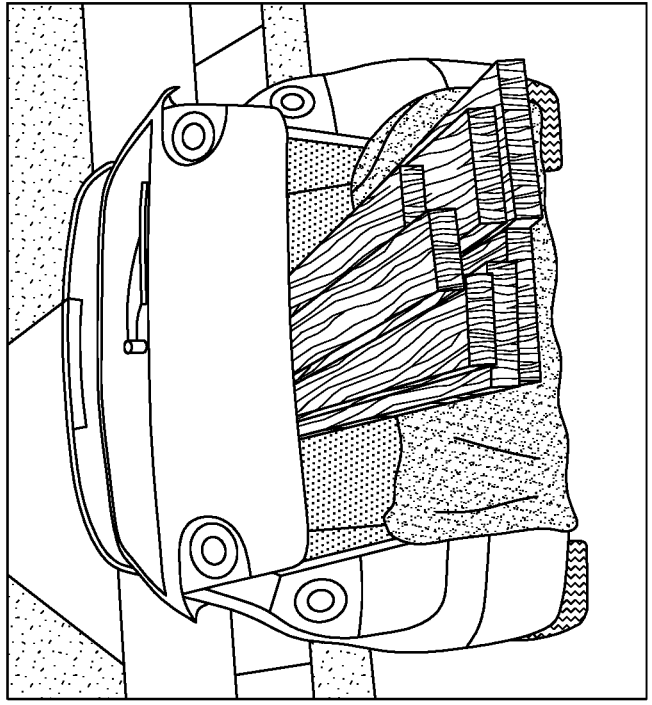
FIG. 7 illustrates an embodiment of virtual dimensional assessment component 122, on a computing device within the distributed data processing environment of FIG. 1, in accordance with an embodiment of the present invention.

In various embodiments, VDAC 122 can be used to determine the storage space in a vehicle. For example, consider a user looking to purchase a desk and transport it home in mid-size sedan. In this particular example, the user could capture a picture of their car and instruct and/or request VDAC 122 to analyze the space inside the vehicle. In this particular example, VDAC 122 augment (either online or in person on a mobile device) an image of the desk onto the available space in the car and determines if the desk will fit in the car by displaying an augmented call out, as shown in in FIG. 7. Additionally, in various embodiments, VDAC 122 can consider the weight of an item/object. In various embodiments, VDAC 122 can calculate, determine, and/or consider the dimensions and/or weight of an object to ensure that a given item will not exceed the weight permitted for a given storage space. For example, determining the weight of the desk doesn't exceed the maximum weight capacity of the user's car.

In various embodiments, VDAC 122 can be used for personalized packaging in fulfillment centers. In various embodiments, VDAC 122 can derive the personalized preferences for where a given user stores items and packages them accordingly with a robotic system. For example, VDAC 122 classifies where items are stored through captured pictures, wherein a user captures photographs on a mobile device of the storage areas. In this particular example, each photo is sent to a cognitive system for analysis. The cognitive system utilizes a Visual Recognition Cognitive Service to classify each object appearing in a photo. In this particular example, VDAC 122 analyzes the placement of these classifications to build a model for where each item should be placed based on the user's storage preferences. In this particular example, a user places an online order for a new pair of shoes. In this particular example, VDAC 122 classifies the item to derive what it is (e.g., menswear, and shoes), and correlates it to where it is likely to be stored based upon where existing items are stored by a user (e.g., the closet). This analysis is repeated for each item in an order. A robotic system uses each correlation to fulfill an order.

In various embodiments, VDAC 122 can instruct/direct a robotic system to correlate items into boxes based on where the user/consumer will be storing the purchased items. For example: cereal and cat food are stored in the same cupboard in a user's kitchen so are grouped together in one box and soda is stored in the user's garage so is packaged in a different box. In various embodiments, VDAC 122 can classify new incoming items to store and derive the most appropriate storage location to store the item with a robotic system. In this particular embodiment, VDAC 122 can classify which items are stored in which storage shelves in a fulfillment center. For example, a new shipment arrives containing items that have not previously been stored at the fulfillment center. In this particular example, VDAC 122, via a robotic system, can derive which storage location/area is the most appropriate to store each item in the shipment based on historic data of item and/or category of items. In this particular example, VDAC 122 correlates the incoming item to the storage locations, and the robotic system is used to move the item into the relevant location.

Figure 1:
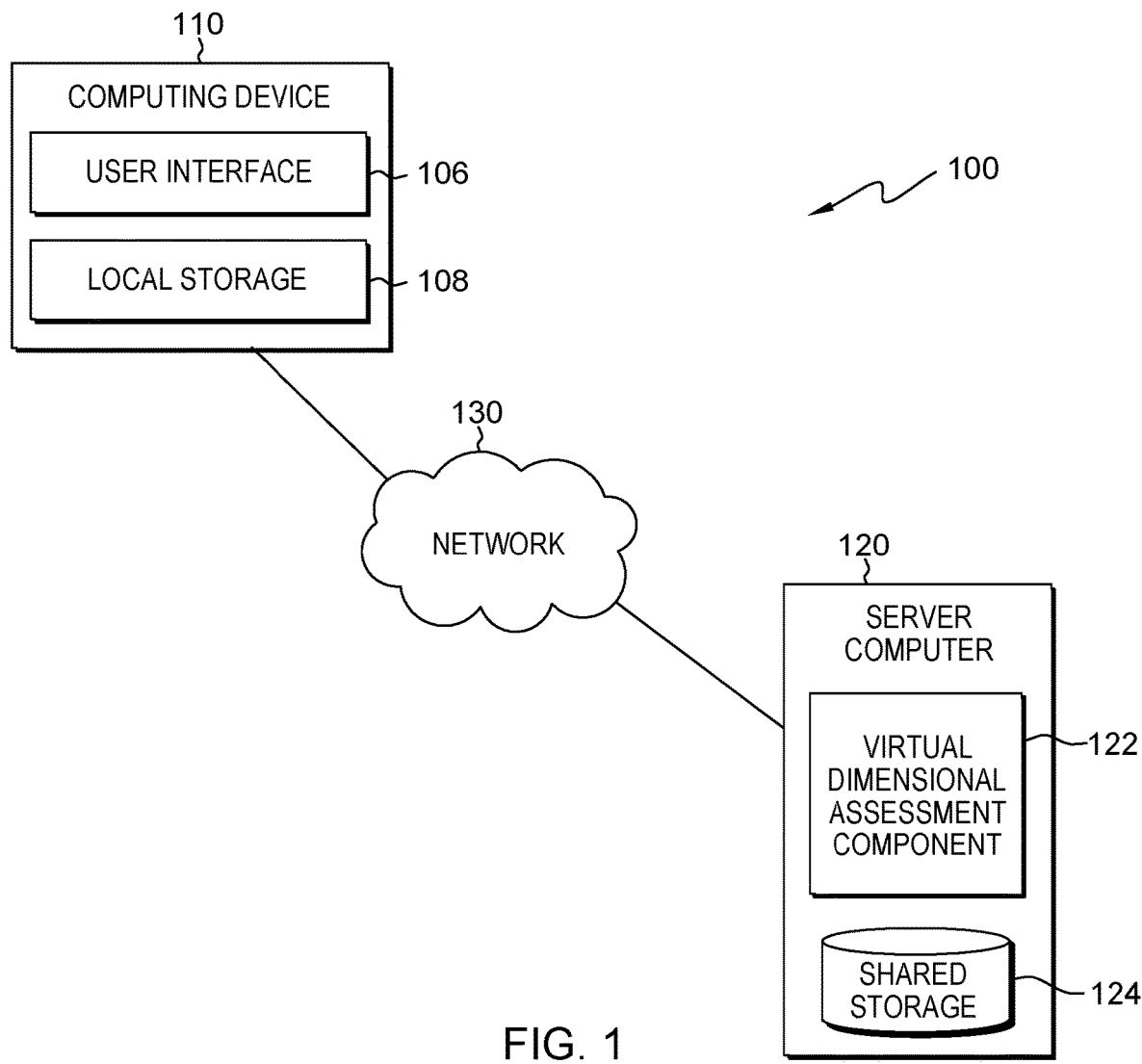
FIG. 1 is a functional block diagram illustrating a distributed data processing environment, in accordance with an embodiment of the present invention.
Figure 8:
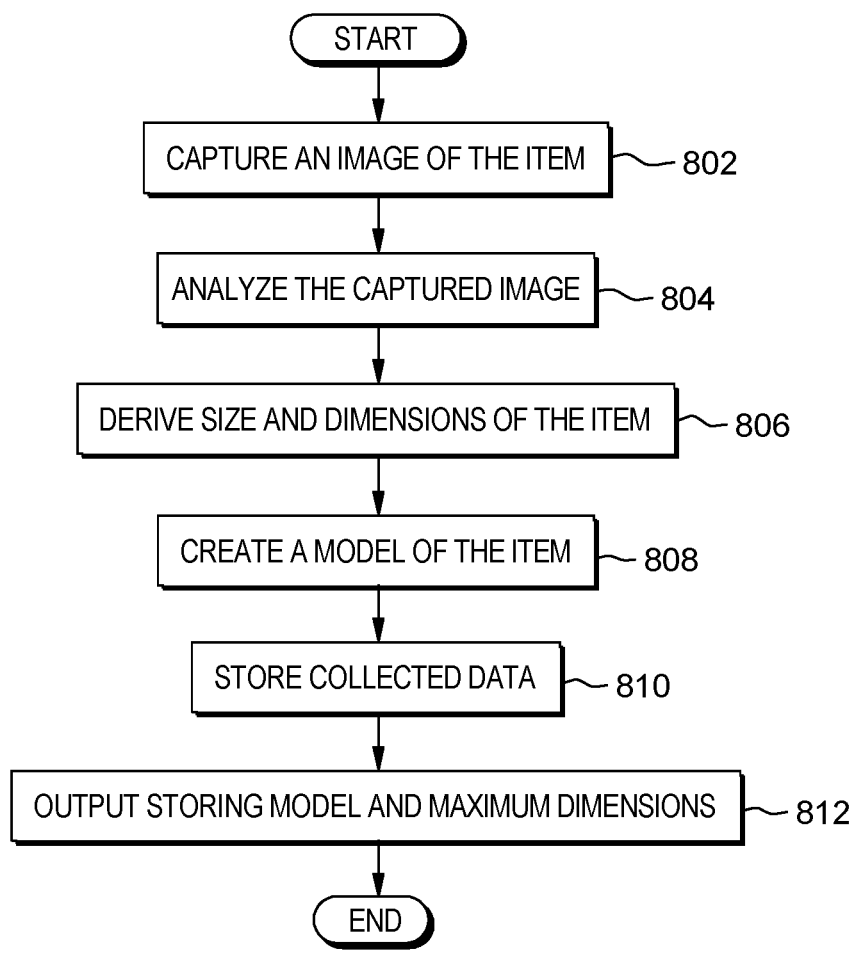
FIG. 8 depicts operational steps of a virtual dimensional assessment component 122, on a computing device within the distributed data processing environment of FIG. 1, in accordance with an embodiment of the present invention.

FIG. 8 depicts operational steps of VDAC 122, on a computing device within the distributed data processing environment of FIG. 1, in accordance with an embodiment of the present invention. FIG. 8 provides only an illustration of one implementation and does not imply any limitations with regard to the environments in which different embodiments can be implemented. Many modifications to the depicted environment can be made by those skilled in the art without departing from the scope of the invention as recited by the claims.

In step 802, VDAC 122 captures an image of an item/object. In various embodiments, VDAC 122 can capture one or more images and/or videos of one or more objects and/or storage spaces using the camera and/or video camera on computing device 110. For example, a user takes a photo of the cans of soup in the cupboard, and a picture of the pantry. In this particular example, a user can take a picture of each can type and categorize each canned food item in VDAC 122, via UI 106, in which the user can input and/or store information about each canned food item and the dimensions and/or weight capacity of the cupboard onto a database (e.g., shared storage 124 and/or local storage 108), in which VDAC 122 can retrieve and/or use at a later time. The stored item information/data comprises of: expiration dates, type/category of food, dimensions of the can, etc. In some embodiments, VDAC 122 can automatically determine item/object information and/store the item/object information to a database.

In step 804, VDAC 122 analyzes the captured image. In various embodiments, VDAC 122 can analyze one or more captured and/or received images and/or videos of one or more items and/or one or more storage spaces. In various embodiments, VDAC 122 can analyze one or more images and/or videos of one or more items and/or one or more storage spaces. In step 806, VDAC 122 derives size and dimensions of the item. In various embodiments, VDAC 122 can derive the size and/or dimensions of one or more items/objects and/or storage areas based on the analysis of the image and/or video of the item and/or storage space.

In step 808, VDAC 122 creates a model of the item. In various embodiments, VDAC 122 can create one or more augmented reality (AR) and/or virtual reality (VR) models of the one or more items and/or storages spaces based on the analysis and/or derived dimensions of the image and/or video of the item and/or storage space. In various embodiments, the one or more AR and/or VR created/generated models of the one or more items and/or storage space can be displayed to the user on computing device 110 via augmented reality. In this particular embodiment, VDAC 122 can display a 3-Dimensional (3D) model of one or more items and/or storage space, via AR. In various embodiments, the user can manipulate the generated 3D AR model via UI 106. For example, a user can move the generated model of a box of breakfast cereal onto different shelves in the pantry and/or into different storage areas. In various embodiments, the model can be generated by mapping the derived dimensions of the item to form a shape. For example, if the system derives the dimensions of a cereal box to be 12×6×2 then a model of that size and shape is rendered.

In step 810, VDAC 122 stores collected data on a database. In various embodiments, VDAC 122 can store the collected and/or received data from the one or more items and/or storage spaces onto a database/knowledge repository (e.g., shared storage 124 and/or local storage 108). In step 812, VDAC 122 outputs storing model and maximum storing dimensions for an item and/or storage area. In various embodiments, VDAC 122 can output one or more AR 3D models of one or more items and/or storage areas and the dimensions of the one or more items and the one or more storage areas. In some embodiments, VDAC 122 can output and ideal storing model for items in a storage space, via AR 3D models and computing device 110. In various embodiments, the ideal storing model can be the storing model that enables the most items to be stored within the storage space. In another embodiment, a user can input an ideal storing model via UI 106. In some embodiments, the output ideal storing model can be interactive and enable a user to interact with the storing model.

Figure 9:
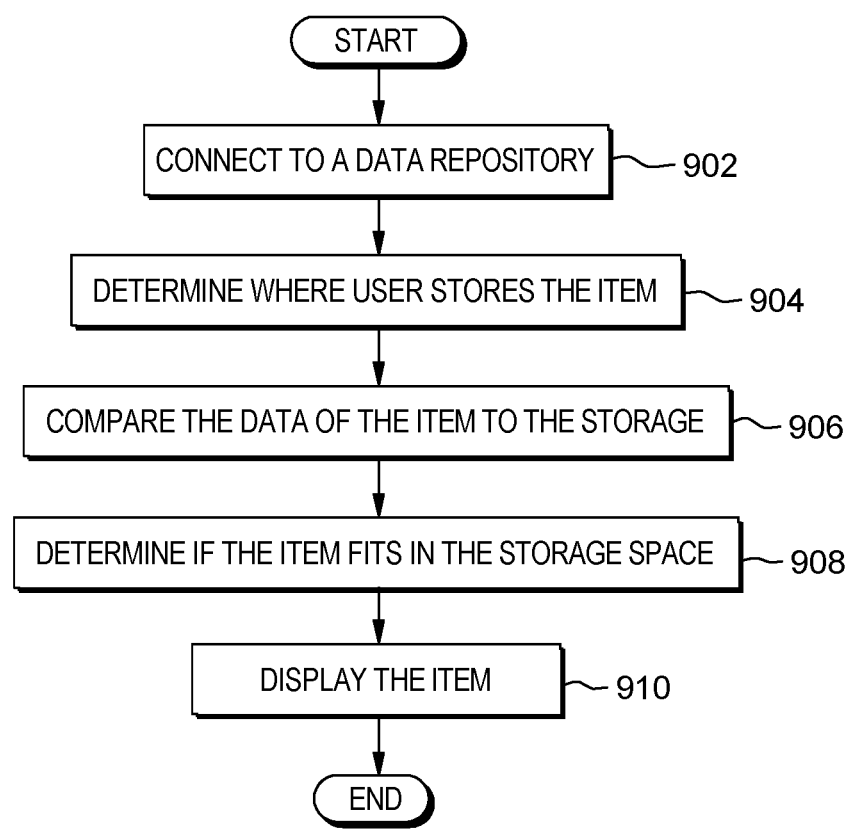
FIG. 9 illustrates operational steps of virtual dimensional assessment component 122, on a computing device within the distributed data processing environment of FIG. 1, in accordance with an embodiment of the present invention.

FIG. 9 illustrates operational steps of VDAC 122, on a computing device within the distributed data processing environment of FIG. 1, in accordance with an embodiment of the present invention. FIG. 9 provides only an illustration of one implementation and does not imply any limitations with regard to the environments in which different embodiments can be implemented. Many modifications to the depicted environment can be made by those skilled in the art without departing from the scope of the invention as recited by the claims.

In step 902, VDAC 122 connects to a data repository. In various embodiments, VDAC 122 can connect to one or more data repositories (e.g., shared storage 124 and/or local storage 108. In various embodiments, VDAC 122 retrieve information about one or more items and/or storage spaces from a knowledge repository. In some embodiments, VDAC 122 can search the Internet to locate information about one or more items and/or storage areas if there is no and/or limited data/information's about the one or more items and/or storage areas on the database/knowledge repository (e.g., local storage 108 and/or shared storage 124). In some embodiments, VDAC 122 can display an interactive prompt to the user, via UI 106, asking permission to search the internet for details/data (e.g., dimensions, weight, etc.) on the one or more items, and/or storage areas.

In step 904, VDAC 122 determines where the user stores the item. In various embodiments, based on the data retrieved from the knowledge repository and/or internet, VDAC 122 can determine where the user stores one or more items (e.g., the users preferred storage location). The storage location can be derived based upon where a user has previously kept an item ("the ketchup is kept in the fridge"), the recommended storage space for an item ("a carton of milk must be refrigerated"), and/or entered by a user, wherein the storage space entered by the user can be stored and retrieved from a database. For example, breakfast cereal is stored on the third shelf of the pantry. In step 906, VDAC 122 analyzes the data of the item to the storage area. In various embodiments, VDAC 122 can compare the data/information of one or more items (e.g., dimensions, size, weight, etc.) to the dimensions and/or available storage space of one or more storage areas.

In step 908, VDAC 122 determines if the item fits in the storage space. In various embodiments, VDAC 122 can determine if the item fits in the preferred storage space by comparing the dimensions of the item and the dimensions of the storage area (e.g., dimensions of the pantry and the shelves in the pantry). In other embodiments, VDAC 122 can determine if the item fits in the preferred storage space by calculating the dimensions of one or more items and the dimension of one or more storage areas. In various embodiments, VDAC 122 can retrieve the dimensions of the item and/or storage area from local storage 108 and/or shared storage 124.

In step 910, VDAC 122 displays the item. In various embodiments, VDAC 122 can display a AR 3D image/model of the item in the preferred storage area. For example, displaying an AR 3D model of a box of cereal on the pantry shelf. In some embodiments, VDAC 122 can display an interactive callout which indicates if the item and/or object will fit in the storage area. In some embodiments, the callout can be a displayed text window which can read as "Fits" or "Doesn't Fit." In other embodiments, the callout can be a color highlighted around the AR 3D model of the object. For example, if box of cereal lights up green that means fits in the storage space but if it lights up red that means it doesn't fit in the designated storage space. In some embodiments, the callout can be an object and/or color in which the user can set the color and definition for the color. For example, a green check mark means the object fits the designated storage area, but a purple x means the object doesn't fit in the designated storage area.

Figure 10:
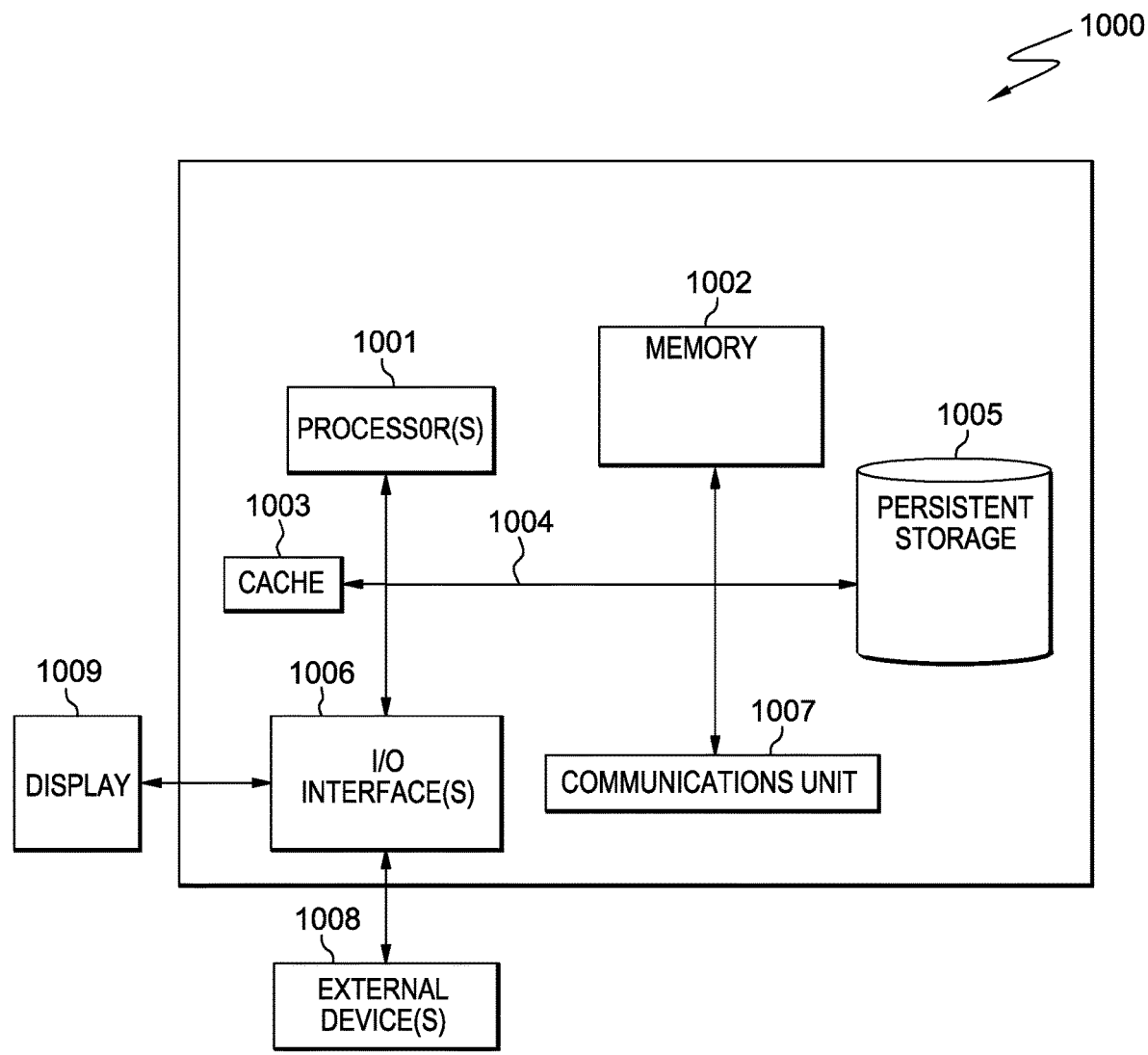
FIG. 10 depicts a block diagram of components of the server computer executing the intelligent mapping program within the distributed data processing environment of FIG. 1, in accordance with an embodiment of the present invention.

FIG. 10 depicts computer system 1000, where server computer 120 represents an example of computer system 1000 that includes VDAC 122. The computer system includes processors 1001, cache 1003, memory 1002, persistent storage 1005, communications unit 1007, input/output (I/O) interface(s) 1006 and communications fabric 1004. Communications fabric 1004 provides communications between cache 1003, memory 1002, persistent storage 1005, communications unit 1007, and input/output (I/O) interface(s) 1006. Communications fabric 1004 can be implemented with any architecture designed for passing data and/or control information between processors (such as microprocessors, communications, and network processors, etc.), system memory, peripheral devices, and any other hardware components within a system. For example, communications fabric 1004 can be implemented with one or more buses or a crossbar switch.

Memory 1002 and persistent storage 1005 are computer readable storage media. In this embodiment, memory 1002 includes random access memory (RAM). In general, memory 1002 can include any suitable volatile or non-volatile computer readable storage media. Cache 1003 is a fast memory that enhances the performance of processors 1001 by holding recently accessed data, and data near recently accessed data, from memory 1002.

Program instructions and data used to practice embodiments of the present invention can be stored in persistent storage 1005 and in memory 1002 for execution by one or more of the respective processors 1001 via cache 1003. In an embodiment, persistent storage 1005 includes a magnetic hard disk drive. Alternatively, or in addition to a magnetic hard disk drive, persistent storage 1005 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 1005 can also be removable. For example, a removable hard drive can be used for persistent storage 1005. Other examples include optical and magnetic disks, thumb drives, and smart cards that are inserted into a drive for transfer onto another computer readable storage medium that is also part of persistent storage 1005.

Communications unit 1007, in these examples, provides for communications with other data processing systems or devices. In these examples, communications unit 1007 includes one or more network interface cards. Communications unit 1007 can provide communications through the use of either or both physical and wireless communications links. Program instructions and data used to practice embodiments of the present invention can be downloaded to persistent storage 1005 through communications unit 1007.

I/O interface(s) 1006 enables for input and output of data with other devices that can be connected to each computer system. For example, I/O interface 1006 can provide a connection to external devices 1008 such as a keyboard, keypad, a touch screen, and/or some other suitable input device. External devices 1008 can also include portable computer readable storage media such as, for example, thumb drives, portable optical or magnetic disks, and memory cards. Software and data used to practice embodiments of the present invention can be stored on such portable computer readable storage media and can be loaded onto persistent storage 1005 via I/O interface(s) 1006. I/O interface(s) 1006 also connect to display 1009.

Display 1009 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for augmenting and organizing items based on a derived storage space, the method comprising:
   determining, by one or more processors, a preferred storage space for one or more items;
   analyzing, by the one or more processors, dimensional data of the one or more items and the preferred storage space;
   calculating, by the one or more processors, if the one or more items fits in the preferred storage space based on the analysis of the dimensional data;
   displaying, by the one or more processors, an augmented reality model of the one or more items in the storage space and an augmented reality call out, indicating whether the one or more items fits in the preferred storage space based on the calculation; and
   instructing, by the one or more processors, a robotic system to determine which storage space is an appropriate space to store each item in a shipment based on historic data of each item.

2. The method of claim 1 further comprising:
   connecting, by the one or more processors, to a data repository, wherein one or more items data can be retrieved; and
   storing, by the one or more processors, the one or more items data.

3. The method of claim 1 further comprising:
   capturing, by the one or more processors, one or more images of the one or more items;
   analyzing, by the one or more processors, the one or more images of the one or more items;
   deriving, by the one or more processors, size, and dimensions of the one or more items based on the analysis of the one or more images; and
   creating, by the one or more processors, an augmented reality model of the one or more items.

4. The method of claim 1, wherein determining the preferred storage spaces comprises: observing and analyzing captured images of one or more storage spaces.

5. The method of claim 4, further comprising:
   storing, by the one or more processors, the determined preferred storage space; and
   outputting, by the one or more processors, one or more storing models of the one or more items in the preferred storage area and storing dimension for one or more items and maximum storing dimensions for the preferred storage space.

6. The method of claim 1 further comprising:
   outputting, by the one or more processors, an interactive callout.

7. A computer system for augmenting and organizing items based on a derived storage space, the computer system comprising:
   one or more computer processors;
   one or more computer readable storage devices;
   program instructions stored on the one or more computer readable storage devices for execution by at least one of the one or more computer processors, the stored program instructions comprising:
   program instructions to determine a preferred storage space for one or more items;
   program instructions to analyze dimensional data of the one or more items and the preferred storage space;
   program instructions to calculate if the one or more items fits in the preferred storage space based on the analysis of the dimensional data;
   program instructions to display an augmented reality model of the one or more items in the storage space and an augmented reality call out, indicating whether the one or more items fits in the preferred storage space based on the calculation; and
   program instructions to instruct a robotic system to determine which storage space is an appropriate space to store each item in a shipment based on historic data of each item.

8. The computer system of claim 7 further comprising:
   program instructions to connect to a data repository, wherein one or more items data can be retrieved; and
   program instructions to store the one or more items data.

9. The computer system of claim 7 further comprising:
   program instructions to capture one or more images of the one or more items;
   program instructions to analyze the one or more images of the one or more items;
   program instructions to derive size and dimensions of the one or more items based on the analysis of the one or more images; and
   program instructions to create an augmented reality model of the one or more items.

10. The computer system of claim 7, wherein determining the preferred storage spaces comprises: observing and analyzing captured images of one or more storage spaces.

11. The computer system of claim 10 further comprising:
    program instructions to store the determined preferred storage space; and
    program instructions to output one or more storing models of the one or more items in the preferred storage area and storing dimension for one or more items and maximum storing dimensions for the preferred storage space.

12. The computer system of claim 7 further comprising:
    program instructions to output an interactive callout.

13. A computer program product for augmenting and organizing items based on a derived storage space, the computer program product comprising:
one or more computer readable storage devices and program instructions stored on the one or more computer readable storage devices, the stored program instructions comprising:
program instructions to determine a preferred storage space for one or more items;
program instructions to analyze dimensional data of the one or more items and the preferred storage space;
program instructions to calculate if the one or more items fits in the preferred storage space based on the analysis of the dimensional data;
program instructions to display an augmented reality model of the one or more items in the storage space and an augmented reality call out, indicating whether the one or more items fits in the preferred storage space based on the calculation; and
program instructions to instruct a robotic system to determine which storage space is an appropriate space to store each item in a shipment based on historic data of each item.

14. The computer program product of claim 13 further comprising:
program instructions to connect to a data repository, wherein one or more items data can be retrieved; and
program instructions to store the one or more items data.

15. The computer program product of claim 13 further comprising:
program instructions to capture one or more images of the one or more items;
program instructions to analyze the one or more images of the one or more items;
program instructions to derive size and dimensions of the one or more items based on the analysis of the one or more images;
program instructions to create an augmented reality model of the one or more items; and
program instructions to output one or more storing models of the one or more items in the preferred storage area and storing dimension for one or more items and maximum storing dimensions for the preferred storage space.

16. The computer program product of claim 13, wherein determining the preferred storage spaces comprises observing and analyzing captured images of one or more storage spaces and claim 15 further comprises:
program instructions to store the determined preferred storage space; and
program instructions to output one or more storing models of the one or more items in the preferred storage area and maximum storing dimensions for the one or more items and the preferred storage area.

17. The computer program product of claim 13 further comprising:
program instructions to output an interactive callout.

* * * * *